United States Patent [19]

Venhuizen et al.

[11] Patent Number: 5,631,766
[45] Date of Patent: May 20, 1997

[54] OPTICAL COMPONENT AND OPTO-ELECTRONIC DEVICE FOR RAISING THE FREQUENCY OF ELECTROMAGNETIC RADIATION

[75] Inventors: Antonius H. J. Venhuizen; Gerardus L. J. A. Rikken; Constance J. E. Seppen, all of Eindhoven, Netherlands

[73] Assignee: U.S. Philips Corporation, New York, N.Y.

[21] Appl. No.: 117,906

[22] Filed: Sep. 7, 1993

[30] Foreign Application Priority Data

Sep. 7, 1992 [EP] European Pat. Off. .............. 92202695

[51] Int. Cl.$^6$ .................................................. G02F 1/37
[52] U.S. Cl. ........................ 359/328; 359/332; 385/122
[58] Field of Search .................................. 385/1–3, 122; 359/326–332

[56] References Cited

U.S. PATENT DOCUMENTS

| | | | |
|---|---|---|---|
| 4,865,406 | 9/1989 | Khanarian et al. | 385/122 |
| 5,002,360 | 3/1991 | Colak et al. | 359/328 X |
| 5,033,810 | 7/1991 | Inoue et al. | 359/328 |
| 5,051,617 | 9/1991 | Normandin et al. | 359/328 |
| 5,106,211 | 4/1992 | Chiang et al. | 359/328 X |
| 5,134,681 | 7/1992 | Ratovelomanana et al. | 385/130 |
| 5,155,791 | 10/1992 | Hsiung | 385/122 |
| 5,217,792 | 6/1993 | Chidsey et al. | 359/328 X |

OTHER PUBLICATIONS

"Poled Polymers for Frequency Doubling of Diode Lasers" Appl. Phys. Lett. vol. 58 (5), Feb. 4, 1991, pp. 435–437.

"Non–Linear Integrated Optics" G.I. Stegeman et al in J. Appl. Phys. 58(12) 1985 (Dec.), pp. R57–R78.

"Frequency Doubling of Diode Lasers With Poled Polymers" Philips Journal of Research, vol. 46, No. 4/5, Jan. 1992, pp. 215–230.

*Primary Examiner*—John D. Lee
*Attorney, Agent, or Firm*—Leroy Eason

[57] ABSTRACT

An optical component (7) is described in which the frequency of electromagnetic radiation is raised and which comprises a non-linear optical medium and an optical modulation structure (21) so as to compensate for the wavelength dispersion in the non-linear optical material so that there is phase matching. By providing a satellite layer (15) having a high refractive index proximate to the modulation structure (21), the wavelength at which phase matching occurs is not critical for the layer thickness of the non-linear optical medium. An opto-electronic device (1) for raising the frequency of electromagnetic radiation, comprising such a component (7) as a frequency-raising element is also described.

11 Claims, 3 Drawing Sheets

OPTICAL COMPONENT AND OPTO-ELECTRONIC DEVICE FOR RAISING THE FREQUENCY OF ELECTROMAGNETIC RADIATION

BACKGROUND OF THE INVENTION

The invention relates to an optical component for raising the frequency of a fundamental wave of electromagnetic radiation, which component comprises a non-linear optical medium having a refractive index $n_1$, in which the frequency is raised, and an optical modulation structure.

The invention also relates to an opto-electronic device for raising the frequency of electromagnetic radiation, comprising such a component as a frequency-raising element.

Raising the frequency is understood to mean both frequency doubling and raising the frequency by a factor unequal to two. Frequency doubling is used to great advantage in apparatuses such as laser printers and scanners and in optical apparatuses for reading and/or writing an optical record carrier, because the information density can thereby be increased. Raising the frequency by a factor unequal to two can be realised by combining radiation of, for example, two radiation sources in which the raised frequency is equal to the sum frequency of the frequencies of the radiation emitted by the radiation sources.

A problem occurring when the frequency of electromagnetic radiation in a non-linear optical medium is raised is that the fundamental wave and the higher harmonic wave generated in the non-linear optical medium propagate at different speeds due to the difference in effective refractive index for the fundamental wave and the frequency-raised wave, in other words, there is wavelength dispersion in the non-linear optical medium. Since higher harmonic radiation propagates at a different speed than the fundamental wave from a position along the direction of propagation in the non-linear optical layer in which a part of the fundamental wave is converted into this higher harmonic radiation, and since frequency conversion is effected at different positions, the different waves of the higher harmonic radiation arriving at a given position along the component have different phases, so that destructive interference will occur between the higher harmonic waves generated at different positions along the component if no further measures are taken after a given distance $l_c$ referred to as the coherence length, resulting in extinction of the frequency-raised radiation. If the rise in frequency is a frequency doubling, the coherence length is given by $l_c=4/(\lambda(n_{eff,\omega}-n_{eff,2\omega}))$, in which $\lambda$ is the wavelength of the fundamental wave, $n_{eff,\omega}$ is the effective refractive index for the fundamental wave and $n_{eff,2\omega}$ is the effective refractive index for the frequency-doubled wave.

Extinction of the higher harmonic radiation can be prevented by ensuring that the propagation speeds of the fundamental wave and of the frequency-doubled wave are equal to each other. This solution is known as phase matching. An example of a phase matching method is described in the publication "Non-linear integrated optics" by G. I. Stegeman and C. T. Seaton in J. Appl. Phys. 58(12), 1985 in which phase matching is effected by eliminating the wavelength dispersion by means of modal dispersion.

The present invention relates to an alternative solution, ensuring that conversion into higher harmonic radiation is only effected at given positions along the direction of propagation, such that the waves generated at said positions are substantially in phase with each other. The fundamental wave and the second harmonic wave continue to propagate at different speeds, but the destructiveness of the interference between the different second harmonic waves due to this difference in speed is suppressed. This solution is known as quasi-phase matching. Quasi-phase matching can be realised by introducing a spatial periodical modulation into the linear and/or non-linear optical properties of the non-linear optical material. Such a method is known, inter alia from U.S. Pat. No. 4,865,406. This Patent describes a component of the type described in the opening paragraph whose non-linear, optical radiation-conducting layer comprises a polymer. Periodical modulation of the non-linear optical behaviour is realised by poling the polymer by means of a periodically modulated electric field. In this way poled and oppositely poled domains are created in the polymer, which domains alternate with each other and whose dimensions in the direction of propagation are determined by the coherence length which is required to prevent extinction of the frequency-doubled radiation.

The conversion efficiency of the component described in said Patent is determined by the accuracy with which the periodical modulation of the non-linear optical properties of the non-linear optical component compensates the difference in effective refractive indices for the two waves. Since this difference in refractive indices is not only determined by the properties of the material but also by the thickness of the non-linear optical layer, a drawback of this method is that a relatively small variation in thickness of the non-linear optical layer may give rise to incomplete phase matching resulting in a low efficiency. Notably if the non-linear optical layer is a thin-film layer such as, for example a polymer, it is difficult to maintain its thickness constant throughout the component.

SUMMARY OF THE INVENTION

It is an object of the invention to provide an optical component for raising the frequency of electromagnetic radiation and an opto-electronic device comprising such a component presenting an efficient increase of frequency which is greatly independent of variations in thickness of the non-linear optical layer of the optical component.

To this end the optical component according to the invention is characterized in that a satellite layer having a refractive index $n_2$, in which $n_2>n_1$, is provided proximate to the modulation structure.

By providing a high refractive index satellite layer, both the fundamental wave and the second harmonic wave are concentrated in this layer instead of in the non-linear optical medium. Consequently, both the effective refractive index for the fundamental wave, $n_{eff,\omega}$, and the effective refractive index for the second harmonic wave, $n_{eff,2\omega}$, is mainly dependent on the thickness and the material of the satellite layer. Consequently, the quasi-phase matching will not be critical at the layer thickness of the non-linear optical medium. Moreover, the satellite layer is to be proximate to the modulation structure so that the electromagnetic radiation can undergo the optical modulation when it propagates through the satellite layer. Proximity is herein understood to mean at such a distance that this structure has a sufficient influence on the electromagnetic radiation. This implies that the satellite layer can also be provided in direct contact with the modulation structure.

A first embodiment of the optical component according to the invention is characterized in that the non-linear optical medium is a waveguide which is present on a substrate having a refractive index $n_3$, in which $n_3<n_1$, the optical modulation structure being realised by providing a periodically structured cladding layer of linear material having a refractive index $n_m$ (in direct contact with the non-linear optical waveguide between the substrate and the waveguide), in which $n_m<n_2$.

Due to the periodical structure of the cladding layer, this cladding layer together with a part of the non-linear optical waveguide constitutes a radiation conducting layer in which the non-linear and/or linear optical properties, dependent on the materials, periodically vary in the direction of propagation of the electromagnetic radiation.

The embodiment of the optical component according to the invention with a structured cladding layer may be characterized in that the cladding layer comprises a series of strips which are located transversely to the direction of propagation of the electromagnetic radiation, said series being formed by first strips having a thickness $d_1$ and a width $L_1$ alternating with second strips having a thickness $d_2$ and a width $L_2$, in which $L_1$ and $L_2$ are measured in the direction of propagation of the electromagnetic radiation, in which $L_1=(2n+1)l_{c,m}$ and $L_2=(2m+1)l_{c,NLO}$ and in which $d_1>d_2$, with n and m being integers and with $l_{c,m}$ being the coherence length of first areas in which the modulation structure is formed from linear optical material and $l_{c,NLO}$ being the coherence length of second areas in which the modulation structure is partly formed from linear optical material.

In this way a radiation-conducting layer is formed having domains in which the non-linear and/or linear optical properties differ from each other. By choosing suitable dimensions for the linear and non-linear optical areas, such as the coherence lengths of the relevant areas in this embodiment, it can be ensured that the higher harmonic waves generated at different positions along the component are in phase with each other so that extinction of the frequency-raised radiation is prevented.

In accordance with a further characteristic feature, $d_2$ may be 0.

In said embodiments the period of the modulation structure, i.e. $L_1+L_2$ is chosen to be such that the difference in effective refractive index for the fundamental wave and the higher harmonic wave is compensated. A maximum conversion efficiency can be obtained by suitable choice of the modulation depth of said structure. If $d_2=0$, the cladding layer is formed by strips having a given thickness $d_1$ at a distance $L_2$ from each other. After non-linear optical material has been provided on the cladding layer, an optical modulation structure having a thickness $d_1$ is obtained which is formed from strips of linear optical material having a width $L_1$ and strips of non-linear optical material having a width $L_2$.

The optical component is preferably characterized in that the cladding layer is formed from silicon oxynitride.

The use of silicon oxynitride has the advantage that the complete structure of the optical component can be manufactured by means of the standard silicon technology.

A preferred embodiment of the optical component according to the invention is characterized in that the waveguide comprises a polymer.

It is to be noted that the use of such a polymer layer as a non-linear optical material is described in the previously mentioned U.S. Pat. No. 4,865,406. Here, quasi-phase matching is achieved by providing a periodical spatial modulation of the non-linearity in the material itself of the frequency-raising layer which, in principle, has a uniform thickness. During manufacture of the layer this can be obtained by periodically modulating the electric field with which the polymer is poled, rather than by providing a cladding layer having a periodical variation of the thickness.

A polymer has the advantage of being a material having a relatively low refractive index. This allows of a wide choice as regards the material for the satellite layers.

The optical component may be a planar waveguide whose dimension transverse to the direction of propagation of the radiation and in a plane parallel to the various layers is not considerably smaller than the dimension in the direction of propagation. However, the optical component according to the invention is preferably further characterized in that the optical component is a channel waveguide.

It is known per se that the use of a channel waveguide instead of a planar waveguide may lead to a considerable increase of the power density because the radiation is trapped in the channel. As a result, the yield of generated second harmonic radiation will increase considerably. A channel is preferably accommodated in the satellite layer.

A further embodiment of the optical component according to the invention is characterized in that the satellite layer comprises $Si_3N_4$.

The use of $Si_3N_4$ has the advantage that the complete structure of the component can be made by means of a standard silicon technology. Moreover, $Si_3N_4$ can be provided over a relatively large distance in a very constant layer thickness.

A further embodiment of the optical component according to the invention is characterized in that the difference in effective refractive index for the fundamental wave and the higher harmonic wave in the non-linear optical layer is at least substantially equal to the effective refractive index difference in the cladding layer.

If the difference in effective refractive indices for the fundamental wave and the higher harmonic wave of the non-linear optical medium and the material of the cladding layer are substantially equal to each other, it follows from the expression for the coherence length that the coherence length $l_{c,m}$ of the first area and the coherence length $l_{c,NLO}$ of the second area are equal to each other. If this condition is fulfilled, the wavelength at which phase matching occurs is only dependent on the period ($L_1+L_2$) of the modulation structure and is not dependent on the ratio $L_2/L_1$. If $l_{c,NLO}=l_{c,m}=l_c$, the phase difference between the fundamental wave and the second harmonic wave will be equal to $2\pi$ after a covered distance which is equal to the period $L_1+L_2=2n'l_c$, with n' being an integer, so that the higher harmonic waves which are subsequently generated are constructively added to the previously generated higher harmonic radiation. The wavelength at which phase matching occurs is then substantially independent of the ratio $L_2/L_1$.

The optical component according to the invention is preferably characterized in that the refractive index of the non-linear optical layer for the fundamental radiation and/or the higher harmonic radiation is at least substantially equal to the corresponding refractive index for the cladding layer.

If the refractive indices of the cladding layer and the non-linear optical material are substantially equal to each other for either the fundamental wavelength, or for the higher harmonic wavelength or for both wavelengths, the linear optical properties are substantially equal to each other and there is no dispersion at the transition between the linear and the non-linear material so that the propagating electromagnetic radiation will experience a homogeneous waveguide with which a higher efficiency can be achieved because the damping losses remain limited. Only the non-linear optical behaviour of the two materials is different.

The invention also provides an opto-electronic device for raising the frequency of a fundamental wave of electromagnetic radiation, which device has a support on which a diode laser is provided for generating the electromagnetic radiation and an optical component in which the frequency is raised, and which is characterized in that the optical component is a component as described hereinbefore and in that the layer of the optical component in which the fundamental wave propagates is in alignment with the active layer of the diode laser, the exit plane of the diode laser and the entrance plane of the optical component being located opposite each other.

These and other aspects of the invention will be apparent from and elucidated with reference to the embodiments described hereinafter.

DETAILED DESCRIPTION OF THE PREFERRED EMBODIMENTS

Figure 1:
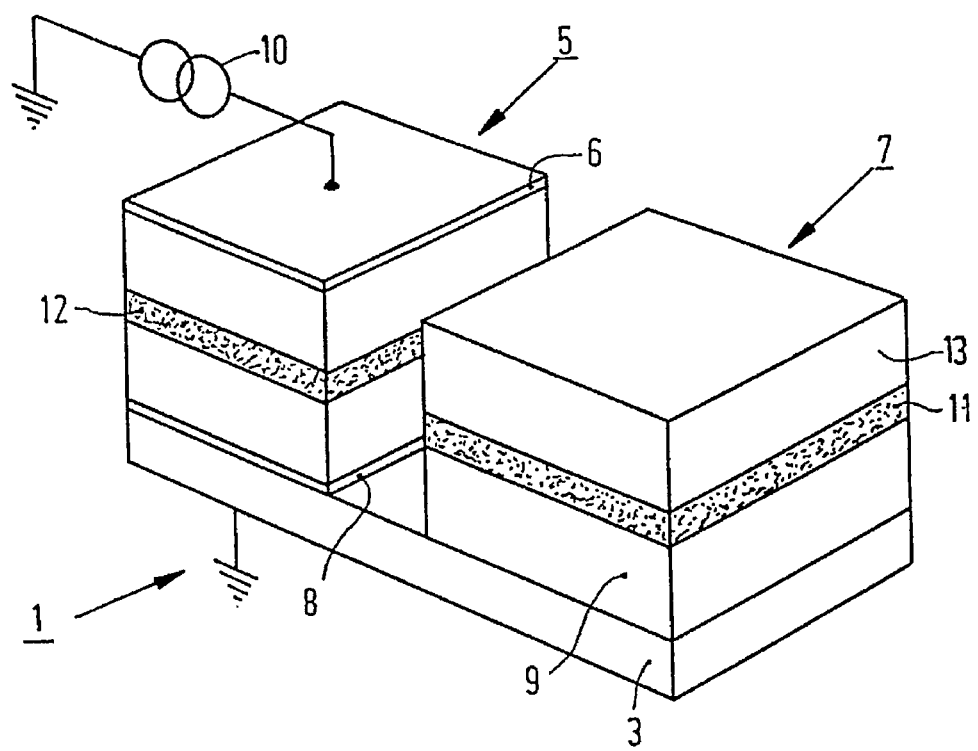
FIG. 1 shows diagrammatically an opto-electronic device comprising an optical component according to the invention.

FIG. 1 shows diagrammatically an opto-electronic device 1 in which electromagnetic radiation is generated and raised in frequency. Such a device 1 may be used in various optical apparatuses such as laser printers, scanners and in apparatuses for reading and/or writing an optical record carrier. By raising, for example, doubling the frequency of the primary radiation supplied by a radiation source, the size of the scanning spot in these apparatuses can be reduced, for example, halved, so that the resolving power of these apparatuses is increased, for example doubled and the density of the information which can be read and/or written with these apparatuses can be increased. Particularly for a writing apparatus such as a laser printer or a writing apparatus for optical record carriers it is important that the frequency-raised radiation has sufficient power so that the frequency conversion is to be effected at a sufficiently high efficiency. This efficiency is understood to mean the quotient of the power of the frequency-raised radiation and the power of the primary radiation. The invention will be further described, by way of example, with reference to frequency doubling.

The opto-electronic device 1 has a support 3 on which a radiation source 5, for example a diode laser is provided for generating the electromagnetic radiation. The diode laser 5 is connected to a current source 10 via electrodes 6, 8. When an electric current is passed through the diode laser via the electrodes 6, 8, electromagnetic radiation with a wavelength λ is generated in the active layer 12. Moreover, an optical component 7 in which the frequency of the radiation generated by the radiation source 5 is doubled is present on the support 3. Such a component 7 comprises a support material 9, referred to as the substrate having a refractive index $n_3$ on which a waveguide 11 having a refractive index $n_1$ is present, which waveguide comprises non-linear optical material and for which it holds that $n_1 > n_3$ for trapping the radiation by total internal reflection.

The diode laser 5 and the component 7 are aligned with respect to each other on the support 3 in such a way that the layer of the component in which the fundamental wave propagates and the active layer 12 of the diode laser 5 are in alignment with each other. If the distance between the elements 5 and 7 is sufficiently small, of the order of several microns, radiation emitted by the diode laser 5 is thus efficiently coupled into the component 7 in which subsequently frequency doubling takes place.

As is known, the fundamental wave and the second harmonic wave would have to propagate in phase with each other for an efficient frequency doubling, because otherwise there would be extinction of the frequency-doubled radiation after a given distance $l_c = 4/[\lambda(n_{eff,2\omega} - n_{eff,\omega})]$ referred to as the coherence length, which extinction would be due to destructive interference between second harmonic radiation waves generated at different positions along the direction of propagation in the component. However, due to the wavelength dispersion occurring in the non-linear optical layer, which wavelength dispersion is caused by the wavelength dependence of the effective refractive index of the material of this layer, this condition is not satisfied without taking further measures.

A known measure of increasing the conversion efficiency is to realise a solution referred to as quasi-phase matching. In this solution it is ensured that conversion into higher harmonic radiation only takes place at given positions along the direction of propagation in the non-linear optical layer so that the higher harmonic waves generated at these positions are substantially in phase with each other.

This spatial selective conversion can be realised by a structure of alternating first and second strips having different linear and/or non-linear optical properties. This structure will be further referred to as optical modulation structure. The fundamental wave and the second harmonic wave continue to propagate at different speeds, but due to periodical modulation of the linear and/or non-linear optical properties of the component, the effect as a result of this difference in speed can be compensated for. In known frequency-raising components this modulation structure is provided in the material itself of the non-linear optical layer. Since the widths of the first and the second strips are dependent on the difference between the propagation speeds of the fundamental wave and the higher harmonic wave, which difference is in turn dependent on the effective refractive indices for the two waves, not only the properties of the material of the non-linear optical layer are important but mainly also the thickness of this layer, because these material properties and the layer thickness determine the effective refractive indices. At given widths of the strips and given material properties, the non-linear optical layer must have an accurately determined thickness. Already at a small deviation of the optimum thickness the chosen optical modulation structure may no longer realise a sufficient phase matching so that the conversion efficiency decreases. Particularly when a polymer layer is used as a non-linear optical layer, practice has proved that the required constant and optimum thickness of this layer is difficult to realise.

In accordance with the invention this problem can be obviated by using a novel concept for the frequency-raising components considered hereinbefore. In accordance with this concept the fundamental wave and the second harmonic wave are concentrated in a part of the non-linear optical layer in which the modulation structure is present. To this end a high refractive index layer having refractive index $n_2$ is provided proximate to the modulation structure. Proximate to is understood to mean at such a distance, including a distance of zero, that this structure has a sufficient influence on the waves. The refractive index $n_2$ is considerably higher than the refractive index $n_1$ of the non-linear optical layer. In the presence of such a high refractive index layer, the centre of the field distribution of the fundamental wave as well as of the higher harmonic is shifted towards the high refractive index layer. Since the electromagnetic radiation mainly propagates in only a part of the non-linear optical layer, the real thickness of this layer no longer plays a role if this layer has a thickness which is larger than a given minimum thickness.

In a plurality of cases the invention can be realised by incorporating only the high refractive index layer in the designs of known frequency-raising components, provided that the operation of the original structure is not disturbed thereby. In other cases, notably if the non-linear optical layer is a polymer layer, it is necessary to displace the optical modulation structure in designs of known frequency-raising components to a new position. An embodiment in which this is the case is shown in FIG. 2.

FIG. 2 shows diagrammatically in detail the structure of a first embodiment of an optical component 7 according to the invention. The substrate 9 may be, for example silicon provided with a layer of silicon dioxide ($SiO_2$) so as to optically isolate the naturally absorbing silicon from the other layers. The substrate may alternatively be made completely of silicon dioxide. A thin high refractive index layer 15 having refractive index $n_2$ is provided on the substrate 9 having refractive index $n_3$ (FIG. 2a). Subsequently, a cladding layer 17 of linear material having refractive index $n_m$ is provided. For this refractive index $n_m$ it holds that $n_m < n_2$. Preferably, $n_m \geq n_3$ for an optimum efficiency. The optical modulation structure is also provided in this layer 17. The optical modulation structure comprises a series of first strips 16 having thickness $d_1$ and width $L_1$ alternating with second strips 16' having thickness $d_2$ and width $L_2$, in which $d_2 < d_1$ as is shown in FIG. 2b. $L_1$ and $L_2$ are the widths of the strips measured in the direction 18 of propagation of the electromagnetic radiation. The longitudinal direction of the strips is transverse to the direction of propagation of the electromagnetic radiation, which is denoted by means of the arrow 18.

Figure 2A:
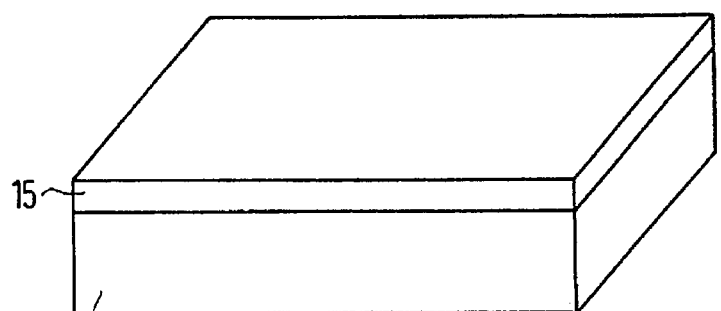
FIGS. 2a–2d are diagrammatic perspective elevational views of the structure of an optical component according to the invention, in which the optical modulation structure is created by means of a periodically structured cladding layer.
Figure 2B:
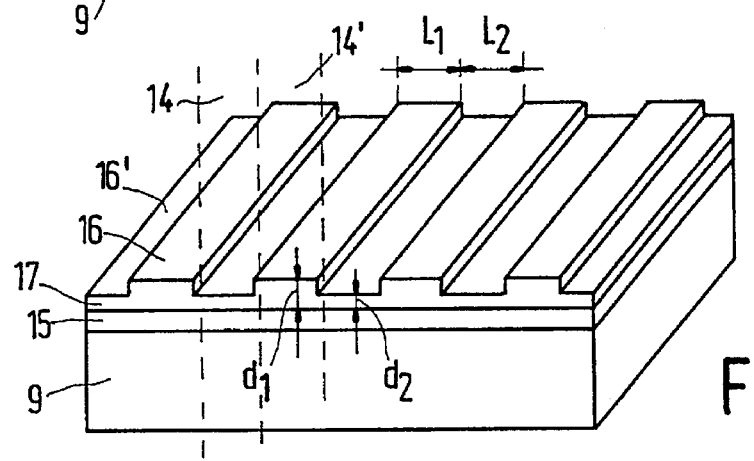
Figure 2C:
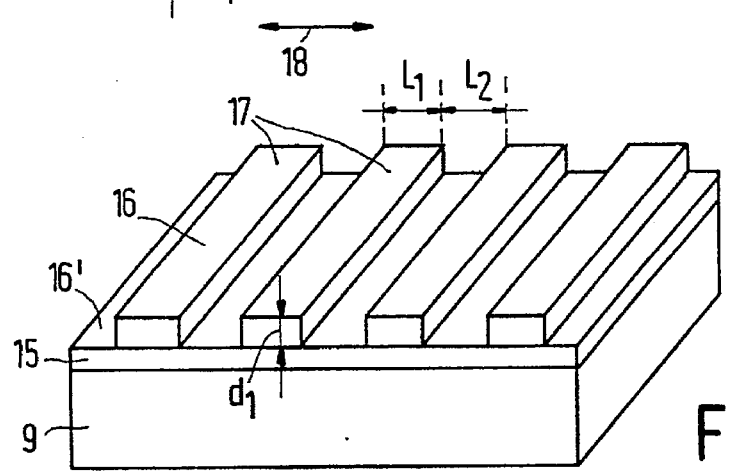

The thickness $d_2$ of the strips 16' may also be equal to zero so that the layer 17 only comprises strips 16 which are separated by strip-shaped intermediate spaces 16', as is shown in FIG. 2c.

Figure 2D:
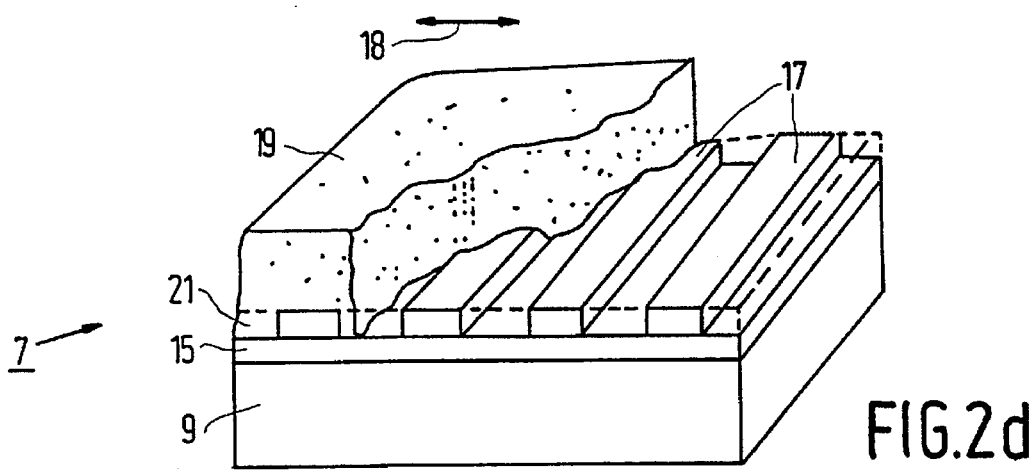

A layer 19 of non-linear optical material is provided on the periodically structured cladding layer 17, as is shown in FIG. 2d for a component for which $d_2=0$. In this way a modulation structure 21 is obtained which comprises first areas 14 formed from linear optical material and second areas 14' at least partly formed from non-linear optical material. The electromagnetic radiation propagating in the component 7 into the direction 18 will then undergo a periodical modulation of the linear and/or non-linear properties, dependent on the materials chosen.

The value of $L_1$ and $L_2$ is determined by the requirement that there should be phase matching. This requirement leads to the conditions $$L_1 = (2n+1)l_{c,m} \text{ and } L_2 = (2m+1)l_{c,NLO}$$

in which m and n are integers, $l_{c,m}$ is the coherence length of the first area 14 and $l_{c,NLO}$ is the coherence length of the second area 14'. In other words, $L_1$ and $L_2$ amount to an odd number of coherence lengths. The numbers m and n may assume the value of zero, but realising areas having one coherence length as a dimension may present problems in practice. The values $L_1$ and $L_2$ may subsequently be obtained from the known expressions for the coherence lengths:

$$l_{c,NLO} = \frac{4}{\lambda} \frac{1}{n_{eff,2\omega}^{NLO} - n_{eff,\omega}^{NLO}}$$

$$l_{c,m} = \frac{4}{\lambda} \frac{1}{n_{eff,2\omega}^{m} - n_{eff,\omega}^{m}}$$

in which $\lambda$ is the fundamental wavelength, $n_{eff,2\omega}^{NLO}$ and $n_{eff,\omega}^{NLO}$ are the effective refractive indices for the second harmonic and the fundamental wave, respectively in the second area 14' and $n_{eff,2\omega}^{m}$ and $n_{eff,\omega}^{m}$ are the effective refractive indices for the second harmonic and the fundamental wave, respectively, in the first area 14.

Dependent on the conversion efficiency at a given modulation period which is necessary to compensate for the difference in effective refractive index for the fundamental wave and the second harmonic wave, which refractive index difference is determined by the properties of the material and the layer thickness of the satellite layer 15, $d_2$ may be chosen to be in the interval $0 \leq d_2 < d_1$.

The satellite layer 15 is preferably provided on the substrate 9, but it may alternatively be provided on the non-linear optical layer 19. A requirement is that the satellite layer 15 should be proximate to the modulation structure, in other words at such a distance that the electromagnetic radiation propagating in the satellite layer 15 may undergo its modulation effect. The satellite layer 15 may be provided, for example in direct contact with the modulation structure. Moreover, the component 7 may be provided with a capping layer (not shown) whose refractive index is lower than that of the non-linear optical layer. The capping layer may alternatively be omitted, in which case the adjoining medium, for example air takes over its function.

Suitable materials for the satellite layer are, for example $Si_3N_4$, AlN, $Nb_2O_5$ and $TiO_2$. All these materials have a sufficiently high refractive index with respect to the non-linear optical materials most commonly used. They are readily etchable and can be provided in thin layers relatively easily. Moreover, $Si_3N_4$ has the additional advantage that the complete frequency-raising component can be manufactured by means of the standard silicon technology when this material is used.

For the non-linear optical material use can be made of various materials known for this purpose, provided that the refractive indices of these materials are sufficiently low to find a material having a significantly higher refractive index for the satellite layer. A very suitable non-linear optical material is the poled polymer of the composition 25/75 MSMA/MMA described in the article "Poled polymers for frequency doubling of diode lasers" in Appl. Phys. Letters, vol. 58(5), 4 Feb. 1991, pp. 435–437. This polymer has a relatively low refractive index, 1.52 for a wavelength of 800 nm and 1.56 for a wavelength of 400 nm.

When specific non-linear optical materials such as, for example the above-mentioned organic polymer are used, it may be a problem in practice to provide the satellite layer 15 on top of the layer of non-linear optical material, because this layer is to be provided at a high temperature so that the polymer layer which is already present may be affected. In these specific cases an embodiment in which the satellite layer is provided under the non-linear optical layer is preferred.

A very suitable linear material for the layer 17 is, for example silicon oxynitride.

It has hitherto been assumed that the optical component 7 is a planar waveguide. However, the invention may alternatively be used in a channel waveguide in which the radiation is trapped within a very narrow area, not only in a first direction, the vertical direction, but also in a second direction, the lateral direction, which is perpendicular to the first direction and the direction of propagation. By trapping the radiation in both directions, a power density is achieved which is higher than in a planar waveguide.

Figure 3:
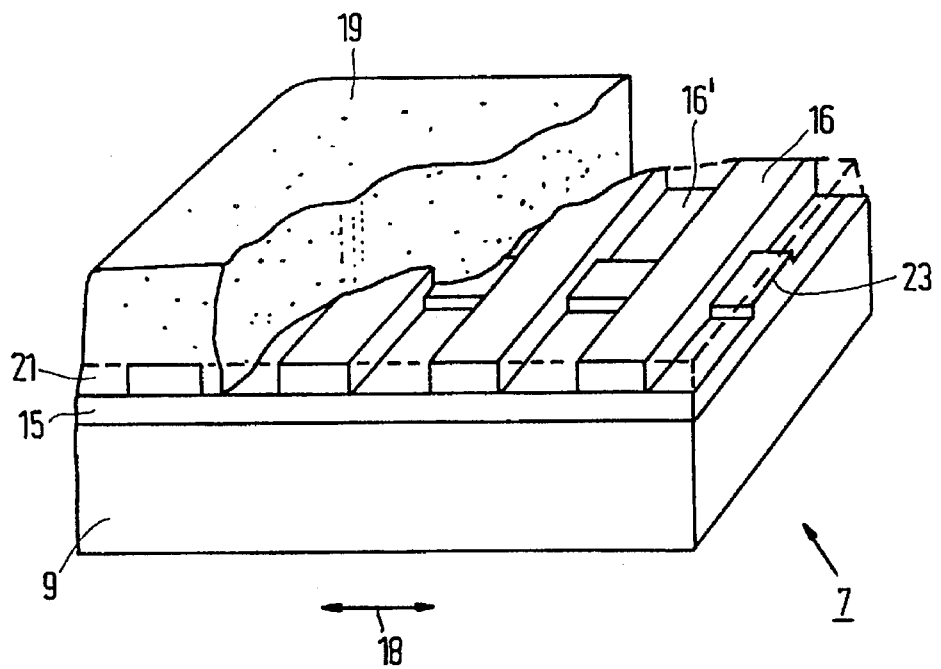
FIG. 3 is a perspective elevational view of the optical component according to the invention shown in FIG. 2d, in which the component is a channel waveguide.

In the case of a channel waveguide with a satellite layer made of one of the above-mentioned materials, the property of these materials being readily etchable can be used to advantage. The channel can then be obtained by etching the satellite layer. The greater part of the surface area of the satellite layer can then be etched away down to a given depth so that the upper face of this layer 15 will have a rib 23 as is shown in FIG. 3. This Figure shows a component 7 having a similar composition as that in FIG. 2d, but whose satellite layer is provided with a rib 23 parallel to the direction 18 of propagation of the electromagnetic radiation so that the component behaves as a channel waveguide.

Generally, a channel waveguide can be realised by providing a rib on the satellite layer and/or by providing a groove in one of the layers having a refractive index which is lower than that of the satellite layer.

The strips 16 of linear optical material in the component of FIG. 3 may be considerably shorter in the direction perpendicular to the channel than those in the component in accordance with FIG. 2d.

Figure 4:
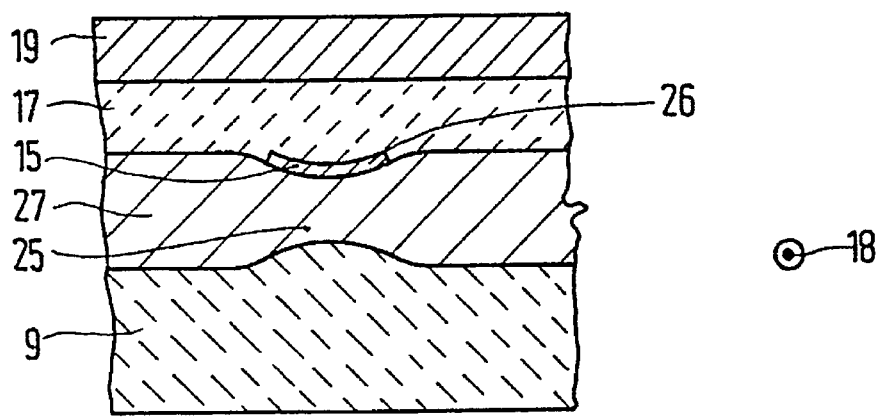
FIG. 4 is a cross-sectional view of an embodiment of an optical component according to the invention in the form of a channel waveguide obtained by making use of local oxidation of silicon (LOCOS)

Analogous to the method as described in the previously filed non-prepublished European Patent Application no. 91202606.9, a channel waveguide may alternatively be obtained by making use of the local oxidation of silicon (LOCOS) technology. FIG. 4 shows, in a cross-section perpendicular to the direction of propagation of the electromagnetic radiation, an embodiment of a channel waveguide realised by means of the LOCOS technology. In this embodiment a strip 26 of a material which is substantially impervious to oxygen is provided on a silicon substrate 9 which is generally already coated with a thin layer of silicon oxide 27. By local oxidation of silicon, at which the oxidation is inhibited at the location of the strip, a groove in the silicon oxide is produced under the strip. The substrate with groove 25 can then successively be provided with a high refractive index layer 15, a cladding layer 17 with the optical modulation structure and a non-linear optical layer 19.

The advantage of using the LOCOS technology is that the groove 25 in the silicon oxide layer 27 has very smooth walls so that there is less loss of radiation than in the case of an etched groove.

If the strip 26 comprises a material having a high refractive index, such as $Si_3N_4$, the strip need no longer be etched away after the groove has been formed, but it may be used as a high refractive index satellite strip 15, as is shown in FIG. 4.

Figure 5:
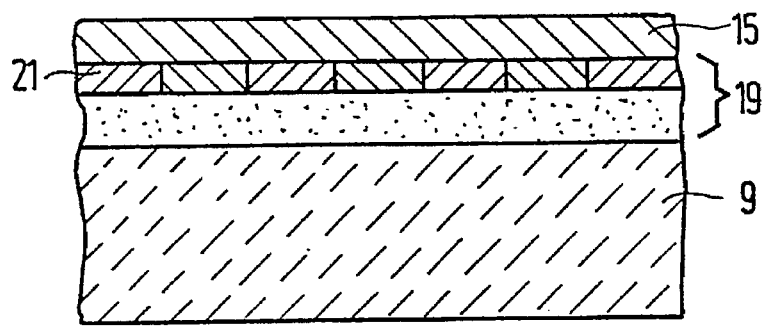
FIG. 5 is a cross-sectional view of an embodiment of an optical component according to the invention, in which the optical modulation structure is provided in the frequency-raising layer.

Instead of providing the modulation structure separately, the periodical structure may also be provided in the frequency-raising layer. FIG. 5 shows an embodiment in which the periodical structure 21 is formed from juxtaposed areas having different optical properties. If the non-linear optical layer is a polymer, these areas may be poled and oppositely poled or poled and unpoled domains, as is known from the previously mentioned United States patent. On the other hand, the modulation structure may alternatively be a periodical square-wave structure formed in the non-linear material (not shown).

In the embodiments described above second harmonic radiation is generated in the area of dimension $L_2$, whereas no second harmonic radiation is generated in the area of dimension $L_1$. If it is ensured that the coherence length of the first area 14, $l_{c,m}$, and the coherence length of the second area 14', $l_{c,NLO}$, are equal to each other, then $$L_1+L_2=(2n+1)l_{c,m}+(2m+1)l_{c,NLO}=2n'l_c$$

and by suitable choice of one parameter, viz. the periods $(L_1+L_2)$ of the modulation structure, the quasi-phase matching condition can be satisfied. After a period $(L_1+L_2)$ the phase difference between the fundamental wave and the second harmonic wave is equal to $2\pi$ so that the second harmonic radiation generated in the subsequent period is constructively added to the previously generated second harmonic radiation. Variations in the ratio $L_2/L_1$, which lead to a wider wavelength band for which quasi-phase matching occurs in the case of unequal coherence lengths $l_{c,m}$ and $l_{c,NLO}$ and to a decrease of the conversion efficiency have no influence any longer, provided that the period $(L_1+L_2)$ remains constant.

It follows from the expression for the coherence length that the required condition for equal coherence lengths should be:

$$\Delta n_{eff,NLO}=\Delta n_{eff,m}$$

or $$n_{eff,2\omega}^{NLO}-n_{eff,\omega}^{NLO}=n_{eff,2\omega}^{m}-n_{eff,\omega}^{m}$$

Moreover, if for the cladding layer 17 a linear material is used whose optical properties are approximately equal to those of the non-linear optical layer 19, in other words, if the refractive indices of the non-linear optical material and of the linear optical material are equal to each other, either for the fundamental wavelength, or for the second harmonic wavelength, or for both wavelengths, in other words if $$n_{NLO}^{\omega}=n_m^{\omega}$$

or $$n_{NLO}^{2\omega}=n_m^{2\omega}$$

or both $$n_{NLO}=n_m$$

the layer 21 comprising the modulation structure is experienced as a homogeneous waveguide by the electromagnetic radiation and there is no dispersal at the transition between the non-linear and the linear optical materials so that a higher efficiency can be achieved.

The invention may also be used in optical components in which there is a frequency raise other than frequency doubling. This may be the case, for example when radiation of two different wavelengths is applied to a waveguide and when radiation having a frequency which is equal to the sum of the two frequencies is generated.

We claim:

1. An optical component for generating a higher harmonic wave from a fundamental wave of electromagnetic radiation, which component comprises a non-linear optical medium having a refractive index $n_1$, in which the frequency is raised, and an optical modulation structure, characterized in that a satellite layer of a linear optical material having a refractive index $n_2$, in which $n_2 > n_1$, is provided proximate to the modulation structure for concentrating the fundamental wave and the generated higher harmonic wave in said satellite layer.

2. An optical component as claimed in claim 1, characterized in that the non-linear optical medium is a waveguide which is present on a substrate having a refractive index $n_3$, in which $n_3 < n_1$, the optical modulation structure being realised by providing a periodically structured cladding layer of linear material having a refractive index $n_m$ between the substrate and the waveguide in direct contact with the non-linear optical waveguide, in which $n_m < n_2$.

3. An optical component as claimed in claim 2, characterized in that the cladding layer comprises a series of strips which are located transversely to the direction of propagation of the electromagnetic radiation, said series being formed by first strips having a thickness $d_1$ and a width $L_1$ alternating with second strips having a thickness $d_2$ and a width $L_2$, in which $L_1$ and $L_2$ are measured in the direction of propagation of the electromagnetic radiation, in which $L_1 = (2n+1)l_{c,m}$ and $L_2 = (2m=1)l_{c,NLO}$ and in which $d_1 > d_2$, with n and m being integers and with $l_{c,m}$ being the coherence length of first areas in which the modulation structure is formed from linear optical material and $l_{c,NLO}$ being the coherence length of second areas in which the modulation structure is partly formed from linear optical material.

4. An optical component as claimed in claim 3, characterized in that $d_2 = 0$.

5. An optical component as claimed in claim 2, characterized in that the cladding layer is formed from silicon oxynitride.

6. An optical component as claimed in claim 2, characterized in that the waveguide comprises a polymer.

7. An optical component as claimed in claim 2, characterized in that the difference in effective refractive index for the fundamental wave and the higher harmonic wave in the non-linear optical medium is at least substantially equal to the effective refractive index difference in the cladding layer.

8. An optical component as claimed in claim 2, characterized in that the refractive index of the non-linear optical medium for the fundamental wave and/or the higher harmonic wave is at least substantially equal to the corresponding refractive index for the cladding layer.

9. An optical component as claimed in claim 1, characterized in that the optical component is a channel waveguide.

10. An optical component as claimed in claim 1, characterized in that the satellite layer comprises $Si_3N_4$.

11. An opto-electronic device for raising the frequency of a fundamental wave of electromagnetic radiation, which device has a support on which a diode laser is provided for generating the electromagnetic radiation and an optical component in which the frequency is raised, characterized in that the optical component is a component as claimed in claim 1 the exit plane of the diode laser and the entrance plane of the optical component being located opposite each other.

* * * * *